(12) United States Patent
Weingarden (10) Patent No.: US 10,332,141 B2
(45) Date of Patent: Jun. 25, 2019

(54) CONSUMER REWARDS FOR POSTING TAGGED MESSAGES CONTAINING GEOGRAPHIC INFORMATION

(71) Applicant: Neal Weingarden, Evanston, IL (US)

(72) Inventor: Neal Weingarden, Evanston, IL (US)

( * ) Notice: Subject to any disclaimer, the term of this patent is extended or adjusted under 35 U.S.C. 154(b) by 835 days.

(21) Appl. No.: 14/591,060

(22) Filed: Jan. 7, 2015

(65) Prior Publication Data

US 2016/0196570 A1    Jul. 7, 2016

(51) Int. Cl.
*G06Q 30/02*        (2012.01)
*H04W 4/02*         (2018.01)
*H04W 68/00*        (2009.01)
*G06Q 50/00*        (2012.01)
*H04W 4/021*        (2018.01)

(52) U.S. Cl.
CPC ..... *G06Q 30/0214* (2013.01); *G06Q 30/0225* (2013.01); *G06Q 50/01* (2013.01); *H04W 4/02* (2013.01); *H04W 4/021* (2013.01); *H04W 68/005* (2013.01)

(58) Field of Classification Search
CPC ............ H04N 21/437; H04N 21/2668; H04N 21/8586; H04N 21/8545; H04N 21/47815; H04N 21/251; H04N 21/4126; H04N 21/42221; H04N 21/25891; H04N 21/4821; H04N 21/482; H04N 21/44222; H04N 21/252; H04N 21/812; G06Q 30/0241; G06Q 30/0267; H04L 65/403; H04L 67/12; H04L 67/306; H04W 4/02; H04W 4/206; H04W 4/021; H04W 76/02; H04W 12/06

USPC .......................................................... 725/9
See application file for complete search history.

(56) References Cited

U.S. PATENT DOCUMENTS

| | | |
|---|---|---|
| 7,848,765 B2 | 12/2010 | Phillips et al. |
| 2007/0016651 A1 | 1/2007 | Blagsvedt et al. |
| 2008/0243906 A1 | 10/2008 | Peters |
| 2011/0028160 A1 | 2/2011 | Roeding et al. |
| 2011/0238766 A1 | 9/2011 | Lew et al. |
| 2012/0150592 A1 | 6/2012 | Govrik et al. |
| 2012/0150973 A1 | 6/2012 | Barak |
| 2012/0158589 A1 | 6/2012 | Katzin et al. |
| 2012/0191512 A1* | 7/2012 | Wuoti ................ G06Q 30/0207 705/14.1 |

(Continued)

OTHER PUBLICATIONS

Wiley Encyclopedia of Computer Science and Engineering (Year: 2009).*

*Primary Examiner* — Peter H Choi
*Assistant Examiner* — Breffni Baggot
(74) *Attorney, Agent, or Firm* — Coats & Bennett, PLLC (57) ABSTRACT

A device exchanges a message with an Internet site in order to provide a reward to a consumer. A user device posts a message to the Internet site, and an authentication server verifies the message and sends notification to the consumer of the reward. The message contains a key string (such as a hashtag), and a geographic location corresponding to a predefined geographic region that is known to the authentication server. The authentication server, which stores a mapping between the predefined geographic region and the key string, verifies the message by determining that the geographic location where the image data was captured is within the predefined geographic region. Having verified the message, the authentication server sends a reward notification to the user device.

24 Claims, 9 Drawing Sheets

(56) References Cited

U.S. PATENT DOCUMENTS

| | | |
|---|---|---|
| 2013/0014136 A1* | 1/2013 | Bhatia ................. H04N 21/252 |
| | | 725/9 |
| 2013/0046823 A1 | 2/2013 | Mitchell et al. |
| 2013/0073474 A1 | 3/2013 | Young et al. |
| 2013/0346170 A1 | 12/2013 | Epstein et al. |
| 2014/0019264 A1 | 1/2014 | Wachman et al. |
| 2014/0038703 A1 | 2/2014 | Lampert et al. |
| 2014/0129353 A1 | 5/2014 | Spevak |
| 2014/0177813 A1 | 6/2014 | Leeds et al. |
| 2014/0188594 A1 | 7/2014 | Kritt et al. |
| 2014/0257957 A1* | 9/2014 | Archuleta .......... G06Q 30/0225 |
| | | 705/14.26 |
| 2014/0278896 A1 | 9/2014 | Anand et al. |
| 2014/0279068 A1 | 9/2014 | Systrom et al. |
| 2014/0282638 A1 | 9/2014 | Pequignot |
| 2014/0289309 A1 | 9/2014 | Mitchell, Jr. et al. |
| 2014/0365581 A1 | 12/2014 | Kennon et al. |
| 2015/0142822 A1* | 5/2015 | Xue .................... G06F 17/3087 |
| | | 707/743 |
| 2015/0327061 A1* | 11/2015 | Haddad ................ H04W 76/02 |
| | | 455/411 |

* cited by examiner

CONSUMER REWARDS FOR POSTING TAGGED MESSAGES CONTAINING GEOGRAPHIC INFORMATION

TECHNICAL FIELD

The present disclosure relates to network enabled devices for rewarding consumers who participate in marketing campaigns with vendors online, and more particularly to using an authentication server to reward consumers who use their user devices to post a message that contains a particular key string, and geographic information that is within a particular geographic region, to an Internet site.

BACKGROUND

Many vendors of goods and/or services engage consumers online, e.g., through marketing via social networks. Often, consumers are driven to participate with vendors purely out of their own enthusiasm and/or interest for particular brands. Other consumers are enticed to participate with vendors online by consumer incentives, such as contests, rebates, and other rewards. This customer participation allows vendors to obtain valuable market research data. For example, participation in an online product giveaway may require a customer to surrender some personal information, such as their address, age, and other interests.

Consumers, self-regulatory trade associations, and governmental regulators have become increasingly sensitive to online privacy issues. As a result, consumers have begun to demand more security in the methods they use to participate with vendors online. In addition, as consumers increasingly understand the value of the information they are sharing with vendors, consumers have begun to demand more value in exchange for their participation. Further still, consumer usage of mobile devices is growing. In fact, many consumers predominantly use their cellular phones to access the Internet. Accordingly, consumers have begun demanding increasingly convenient and entertaining ways by which to participate with vendors online.

SUMMARY

Embodiments of the present disclosure generally relate to devices that exchange a message with an Internet site, in order to provide a reward to a consumer. In exemplary embodiments of the present disclosure, a user device posts a message to the Internet site, and an authentication server verifies the message and sends notification to the consumer of the reward. The message contains a key string (such as a hashtag), and a geographic location corresponding to a predefined geographic region that is known to the authentication server. The authentication server, which stores a mapping between the predefined geographic region and the key string, verifies the message by determining that the geographic location where the image data was captured is within the predefined geographic region. Having verified the message, the authentication server sends a reward notification to the user device. This process may be used, for example, to reward users for demonstrating on social media that they attended a particular promotional event by posting a photo taken from the event site, and a given hashtag, to the Internet site. This process may also be used, for example, to reward users for helping to popularize the key string, or hashtag, within the Internet site.

Exemplary embodiments of the disclosure also comprise methods, implemented in an authentication server, of verifying a message posted to an Internet site. The method comprises storing a mapping between a key string and a predefined geographic region. The method further comprises obtaining a first message posted to the Internet site. The first message comprises a text part comprising the key string. The first message further comprises a media part, distinct from the text part, comprising a first geographic location. The method further comprises detecting the key string within the text part of the first message, and verifying the first message by determining that the first geographic location in the first message is within the predefined geographic region mapped to the key string.

In some embodiments, the method further comprises receiving a notification that the first message has been posted to the Internet site, and obtaining the first message comprises fetching the first message from the Internet site.

In some embodiments, the first message is associated with an Internet user, and method further comprises sending a reward notice to the Internet user in response to verifying the first message.

In some embodiments, the key string is a metadata tag used by the Internet site to track other messages also comprising the key string.

In some embodiments, the media part of the first message comprises image data and metadata describing the image data. The first geographic location is comprised within the metadata describing the image data.

In some embodiments, verifying the first message by determining that the first geographic location in the first message is within the predefined geographic region mapped to the key string comprises sending the first geographic location in the first message to a location server and receiving the predefined geographic region in response, as well as determining that the key string in the first message corresponds to the predefined geographic region according to the stored mapping.

In some embodiments, the method further comprises receiving a key string request from a user device, the key string request comprising the first geographic location. The method further comprises sending the first geographic location to a location server and receiving the predefined geographic region in response. The method further comprises determining the key string using the predefined geographic region and the stored mapping, and in response, sending the key string to the user device.

In some embodiments, the method further comprises obtaining a second message posted to the Internet site, and rejecting verification of the second message in response to at least one of the second message omitting the key string, the second message omitting the first geographic location, and the second message comprising the key string and a second geographic location, the second geographic location being outside of the predefined geographic region mapped to the key string.

Other embodiments comprise methods, implemented in a user device, of obtaining a reward notification by posting a message to an Internet site. The method comprises receiving a reward notification in response to sending a geographic location to an authentication server and receiving a key string in response if the geographic location is within a predefined geographic region, posting a first message to the Internet site, and informing the authentication server of the posted first message. The first message comprises a text part comprising the received key string; and a media part, distinct from the text part, comprising the geographic location.

In some embodiments, the method further comprises capturing image data at the geographic location, and generating metadata, describing the image data, upon capturing the image data. The metadata comprises the geographic location, and the media part of the first message comprises the image data and the metadata.

In some embodiments, the received key string is a metadata tag used by the Internet site to track other messages also comprising the received key string.

In some embodiments, the method further comprises receiving a denial of the reward in response to posting a second message to the Internet site. The second message omits one or more of the received key string and the geographic location.

Other embodiments comprise an authentication server that verifies a message posted to an Internet site. The authentication server comprises memory configured to store a mapping between a key string and a predefined geographic region. The authentication server further comprises one or more communications circuits configured to obtain a first message posted to the Internet site. The first message comprises a text part comprising the key string, and a media part that is distinct from the text part and comprises a first geographic location. The authentication server further comprises one or more processing circuits communicatively coupled to the communications circuits and the memory. The one or more processing circuits are configured to detect the key string within the text part of the first message, and verify the first message by determining that the first geographic location in the first message is within the predefined geographic region mapped to the key string.

In some embodiments, the one or more communications circuits are further configured to receive a notification that the first message has been posted to the Internet site, and, to obtain the first message, the one or more communications circuits are configured to fetch the first message from the Internet site.

In some embodiments, the first message is associated with an Internet user, and the one or more communications circuits are further configured to send a reward notice to the Internet user in response to the one or more processing circuits verifying the first message.

In some embodiments, the key string is a metadata tag used by the Internet site to track other messages also comprising the key string.

In some embodiments, the media part of the first message comprises image data, and metadata describing the image data. The first geographic location is comprised within the metadata describing the image data.

In some embodiments, to verify the first message by determining that the first geographic location in the first message is within the predefined geographic region mapped to the key string, the one or more processing circuits are configured to send the first geographic location in the first message to a location server via the one or more communications circuits and receive the predefined geographic region in response, as well as determine that the key string in the first message corresponds to the predefined geographic region according to the mapping stored in memory.

In some embodiments, the one or more communications circuits are further configured to receive a key string request from a user device (the key string request comprising the first geographic location), send the first geographic location to a location server and receive the predefined geographic region in response. The one or more processing circuits are further configured to determine the key string using the predefined geographic region and the mapping stored in memory. The one or more communications circuits are further configured to send the key string to the user device in response to the one or more processing circuits determining the key string.

In some embodiments, the one or more communications circuits are further configured to obtain a second message posted to the Internet site. The one or more processing circuits are further configured to reject verification of the second message in response to at least one of the second message omitting the key string, the second message omitting the first geographic location, and the second message comprising the key string and a second geographic location, the second geographic location being outside of the predefined geographic region mapped to the key string.

Other embodiments comprise a user device that obtains a reward notification by posting a message to an Internet site. The user device comprises one or more communications circuits configured to receive a reward notification in response to sending a geographic location to an authentication server and receiving a key string in response if the geographic location is within a predefined geographic region, posting a first message to the Internet site, and informing the authentication server of the posted first message. The first message comprises a text part comprising the received key string, and a media part, distinct from the text part, comprising the geographic location.

In some embodiments, the user device further comprises one or more image capture circuits configured to capture image data at the geographic location, and one or more processing circuits configured to generate metadata, describing the image data, upon the one or more image capture circuits capturing the image data. The metadata comprises the geographic location. The one or more communications circuits are configured to receive the reward notification in further response to the one or more image capture circuits capturing the image data and the one or more processing circuits generating the metadata.

In some embodiments, the received key string is a metadata tag used by the Internet site to track other messages also comprising the received key string.

In some embodiments, the one or more communications circuits are further configured to receive a denial of the reward in response to posting a second message to the Internet site. The second message omits one or more of the received key string, and the geographic location.

Other embodiments comprise a computer program product stored in a non-transitory computer readable medium for controlling a programmable authentication server. The computer program product comprises software instructions that, when executed on the programmable authentication server, cause the programmable authentication server to perform the methods described above.

Other embodiments comprise a computer program product stored in a non-transitory computer readable medium for controlling a programmable user device. The computer program product comprises software instructions that, when executed on the programmable user device, cause the programmable user device to perform the method described above.

DETAILED DESCRIPTION

Figure 1:
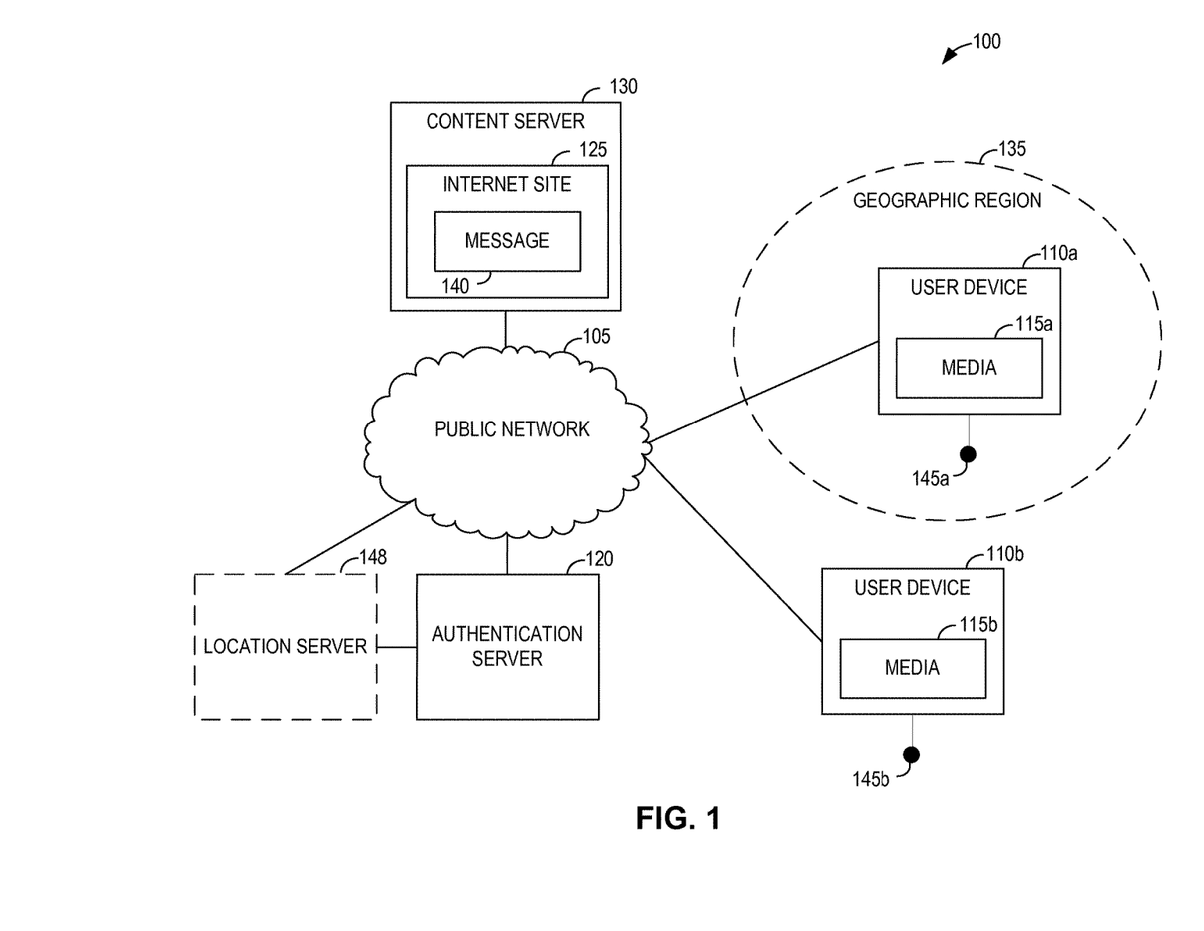
FIG. 1 illustrates an exemplary network according to embodiments of the present disclosure.

Embodiments of the present disclosure generally relate to posting messages to Internet sites which can be verified in order to obtain consumer rewards, such as rebates and discounts off of goods and services. FIG. 1 illustrates an exemplary network 100 according to various embodiments. The network 100 comprises a public network 105, such as the Internet, that enables user devices 110 to communicate with a content server 130. The content server 130 hosts an Internet site 125 that the user devices 110 are able to access from a variety of geographic locations 145. Examples of user devices 110 include, but are not limited to, cellular phones, tablets, and personal computers. Examples of the content server 130 hosting Internet site 125 include, but are not limited to a web server hosting a social media website, a storage server hosting a cloud storage solution, and a usenet server hosting a usenet service. One of ordinary skill in the art will appreciate the various forms of network-enabled user devices 110 and the variety of content servers 130 they may access in order to make use of an Internet site 125.

The user devices 110 that access and use Internet site 125 may be geographically distributed across any distance. For example, a first user device 110a may be located at a geographic location 145a, which falls within a certain predefined geographic region 135 of interest. A second user device 110b, on the other hand, may be located at a geographic location 145b that is outside of the predefined geographic region 135. One way that the user devices 110 can use Internet site 125 is by posting messages 140 that are visible to others. For example, the first user device 110a may record some media 115a, such as a photo or video, from geographic location 145a within the geographic region 135, and post that media 115a to Internet site 125 via message 140. In this way, a second user device 110b at another geographic location 145b can access, and optionally render, the media 115a that the first user device 110a posted. The second user device 110b can similarly post media 115b to the Internet site.

Exemplary network 100 also comprises an authentication server 120. The authentication server 120 is also able to communicate with user devices 110 and content server 130 via public network 105. After a user device 110 posts a message 140 to Internet site 125, the user device 110 can inform the authentication server 120 of the posted message 140, and the authentication server 120 can obtain that message 140 via the public network 105. The authentication server 120 can then verify that the message 140 has certain properties. For example, the authentication server 120 can verify that media 115a within the message 140 was taken from a geographic location 145a that is within geographic region 135. The authentication server 120 can also verify other attributes of the posted message 140, such as when the message 140 was posted, the date/time that media 115a was captured, and whether the posted message specifies certain key words, phrases, or hashtags, and other criteria.

According to embodiments, authentication server 120 communicates with location server 148 in order to determine the geographic region 135 that pertains to geographic location 145a. For example, authentication server 120 sends the geographic location 145a found within message 140 to location server 148 (either via public network 105, or via a private connection such as a private network or direct connection). Location server 148 determines a predefined geographic region 135 that corresponds to geographic location 145a, and returns this region 135 to the authentication server 120. For example, the region 135 that location sever 148 returns may be the building, facility, street, neighborhood, city, county, state, or country to which geographic location 145a belongs. The region 135 that location server 148 returns may also be a preconfigured virtual boundary, such as a geofence.

In this way, the location verification functions performed by authentication server 120 can be simplified. For example, authentication server 120 may not actually understand the metes and bounds of geographic region 135. Instead, authentication server 120 may be configured to understand that geographic region 135 is identified by location server 148 according to a particular region identifier. Thus, authentication server can verify that the geographic location 145a included in message 140 is within geographic region 135 by relying on location server 148 to return a region identifier that matches one which is preconfigured at the authentication server 120. If the region 135 returned to authentication server 120 matches what has been preconfigured, the authentication server 120 verifies the message, and sends a reward notification to the user device 110a that posted the message 140. Although the various embodiments described herein will presume that a separate location server 148 is employed, other embodiments may make use of a single physical platform to implement the functions of both the authentication server 120 and the location server 148.

Figure 2:
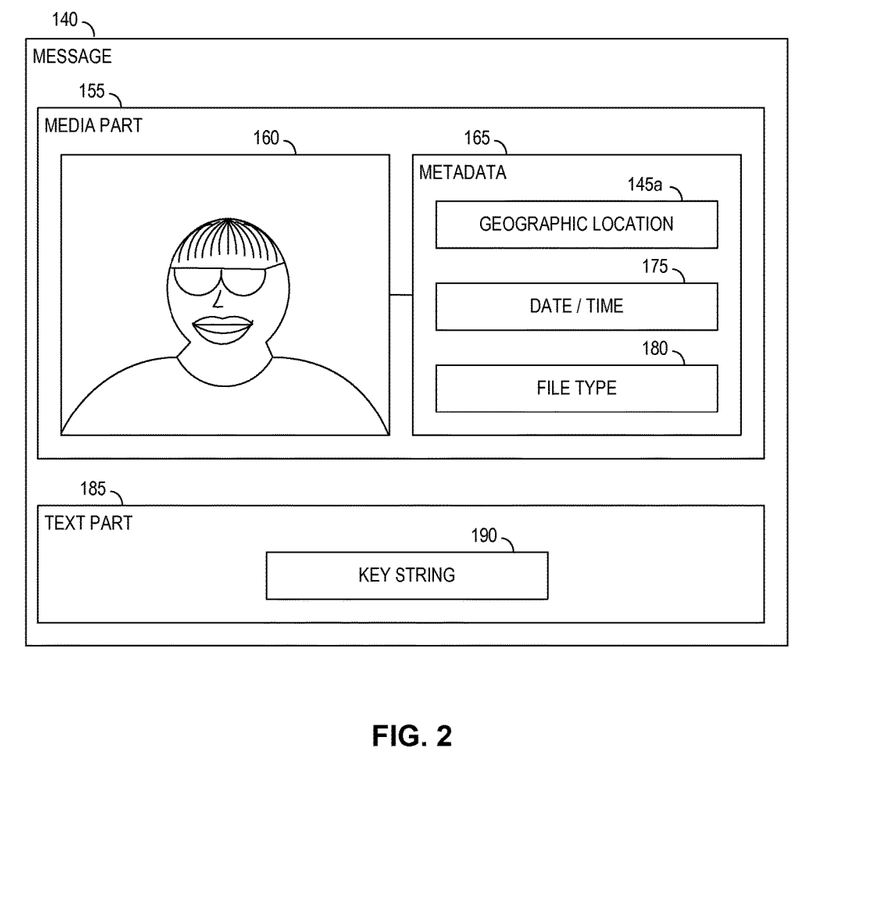
FIG. 2 illustrates a logical representation of an exemplary message posted to an Internet site, according to embodiments of the present disclosure.

By validating only those messages that meet particular combinations of criteria, the authentication server 120 can incentivize very particular online consumer behaviors. FIG. 2 depicts a logical representation of an exemplary message 140, as posted to Internet site 125 by user device 110a. Message 140 includes a media part 155, and a text part 185 that is distinct from the media part 155. The media part comprises image data 160, such as a picture that user device 110a took while present at geographic location 145a. The media part also comprises metadata 165 that describes the image data 160. The metadata 165 may specify the geographic location 145a, along with the date/time 175 that the image data 160 was captured, and the file type 180 of the image data 160. The text part may be, for example, a comment or caption provided by the user when posting the message 140 to the Internet site 125. Included within the text part is a key string 190, which may be a key word, key phrase, hashtag, or other string of characters that are identifiable by authentication server 120.

The inclusion of the key string 190 within the text part 185 of the message 140 can provide a number of benefits. For example, the presence of the key string 190 may indicate to the authentication server 120 that this message 140 was posted for the specific purpose of obtaining a reward. The key string 190 may be also be associated with a particular marketing campaign, the effectiveness of which can be gauged by the number of messages observed by the authentication server 120 containing this key string 120. Thus, the authentication server 120 may keep metrics with regard to key string 120, such as the manner and extent to which key string 120 is utilized.

The key string 190 may also be a hashtag or other metadata tag used by the Internet site 125 to track other posted messages that also comprise the key string 190. Many Internet sites 125 use hashtags, for example, to track subjects that are upwardly trending in popularity. The most popular hashtags are often prominently promoted by such Internet sites 125, thereby further popularizing the topic, and possibly causing the topic "go viral," or be widely discussed by users. On such Internet sites 125, users typically designate that a string of characters is a hashtag by prefixing the string of characters with the "#" symbol, commonly known as the number sign, pound sign, or simply "hash." By the authentication server 120 requiring that a particular hashtag identify a particular brand name in order for a user to receive a reward, users can be incentivized to cause that brand name to "trend" on the Internet site 125.

Consider, for example, a marketing campaign in which a concert is being held at DeWitt Clinton Park in New York City. The organizers of this concert may wish to publicize the band that is playing the concert, and perhaps reward consumers in attendance by giving them a discount off of the band's album if they take photos of the concert and post those photos online. If the concert is sponsored, photos taken from within DeWitt Clinton Park during the concert may also be highly likely to capture product placements or ads of the concert's sponsors. In order to participate in the marketing campaign, these consumers may be encouraged to download and use a particular application on their user device 110a through ordinary marketing methods that will be apparent to one of ordinary skill in the art.

Figure 3:
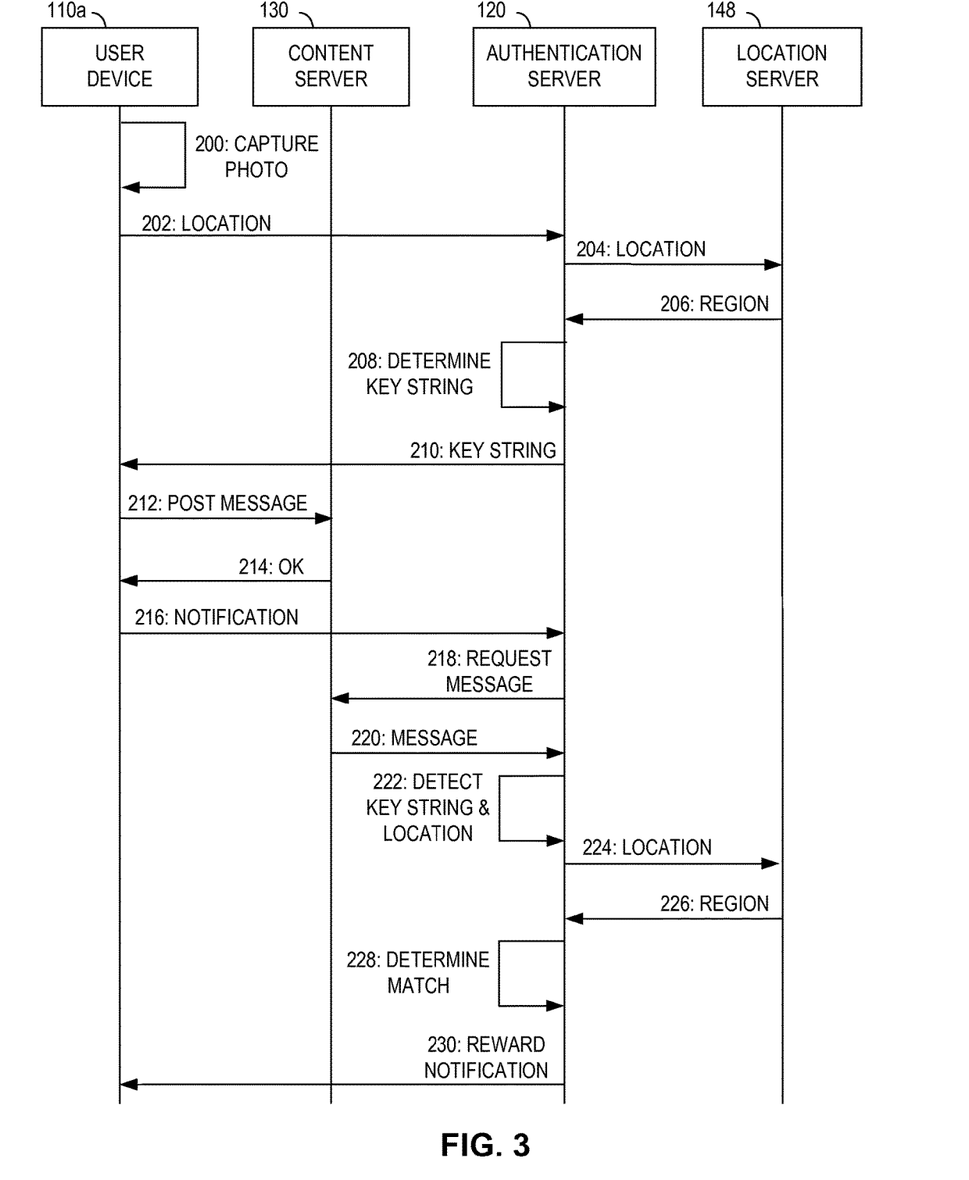
FIG. 3 illustrates an example of messaging within the network according to embodiments of the present disclosure.

FIG. 3 illustrates an example of messaging that is exchanged within the network 100 to enable a consumer who participates in such a marketing campaign, using their user device 110a, to obtain a reward. To begin, user device 110a captures a photo 160 at a geographic location 145a that is within a predefined geographic region 135 (step 200). As is common to many cameras, cellular phones, and other devices, user device 110a has a geopositioning capability built-in, such as a Global Positioning System (GPS), or Assisted-GPS mechanism. Upon capturing the photo 160, the user device 110a generates metadata 165 describing the photo 160, including the geographic location 145a where the photo 160 was taken. The user device 110a sends this geographic location 145a to authentication server 120 in order to learn of a key string 190 that corresponds to the rewards campaign being held at a predefined geographic region 135 surrounding the location 145a (step 202). The authentication server 120 forwards the geographic location 145a to location server 148 (step 204) which determines a predetermined geographic region 135 of appropriate scope surrounding the location 145a and returns that region 135 back to the authentication server 120 (step 206). The location server 148 may be informed of what the appropriate scope is when the authentication server 120 sends the location 145a, or the location server 148 may be designed such that it returns a hierarchy of geographic regions from which authentication server 120 selects one that is appropriate. In this example, the location server 148 returns a unique identifier that identifies a region 135 that aligns with the geographic borders of DeWitt Clinton Park in response to the authentication server 120. Other solutions for resolving a geographic location 145 to a broader geographic region 135 will be apparent to one of ordinary skill in the art.

The authentication server 120 stores a mapping between a key string 190 and the predefined geographic region 135 returned by the location server 148. The authentication server 120 uses the predefined geographic region 135 returned from the location server 148, and the mapping, to determine the appropriate key string 190 (step 208) and return that key string 190 to the user device 110a (step 210).

In order to obtain the reward, the user device 110a communicates with content server 130 in order to post a message 140 that comprises the key string 190, the captured photo 160, and the metadata 165 comprising the geographic location 145a to Internet site 125 (step 212). The content server 130 replies with a confirmation that the message 140 was successfully posted (step 214). Having posted the message 140, user device 110a informs the authentication server 120 of the posted message 140, such as by a notification comprising an address where the message 140 can be publicly accessed (step 216). Alternatively, the notification of the posted message 140 identifies a particular user, and the message 140 is among a plurality of messages posted to that user's profile on Internet site 125, which is accessible to authentication server 120. Other mechanisms for notifying authentication server 120 of the message 140 posted to the Internet site 125 will be apparent to those of ordinary skill in the art.

The authentication server 120 sends a request to the content server 130 to fetch the message 140 (step 218). The content server 130 responds with the requested message 140 (step 220) which the authentication server 120 parses in order to detect the key string 190 within the text part 185 of the message 140. The authentication server 120 also parses the metadata 165 to detect the geographic location 145a where the photo 160 was taken. Because the authentication server 120 stores a mapping between the key string 190 and a predefined geographic region 135, the authentication server will check whether the geographic location 145a in the metadata 165 is within the geographic region 135 mapped to the key string 190. To do so, authentication server 120 sends the geographic location 145a to the location server 148 (step 224). In this example, the predetermined geographic region 135 is received from the location server 148 in response (step 226). Thus, the authentication server verifies the message 140 because the authentication server 120 detects that the key string 190 in the message 140 matches the predetermined geographic region 135 the authentication server 120 has mapped to the key string 190 (step 228). Accordingly, the authentication server 120, sends a reward notification to the user of the user device 110a (e.g., via a push notification to user device 110a) (step 230).

Figure 4:
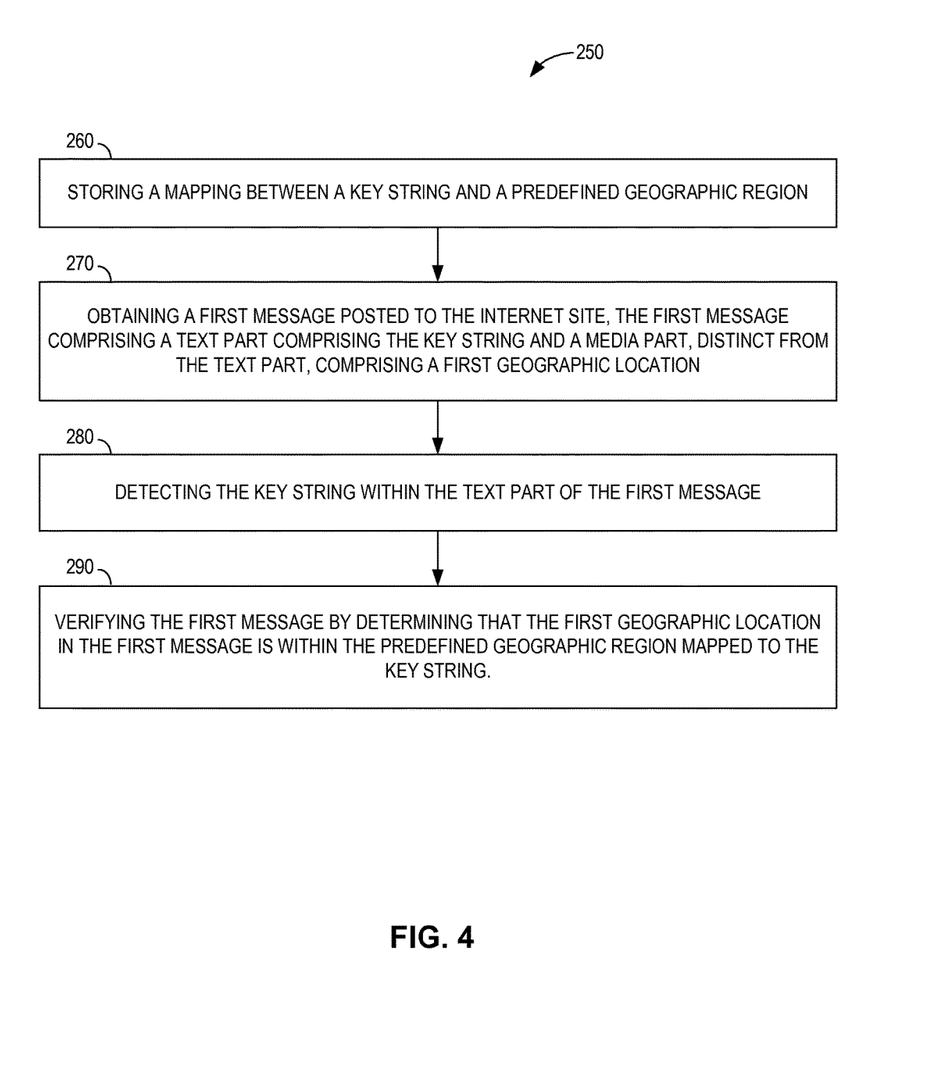
FIG. 4 illustrates an exemplary method for an authentication server to verify a message posted to an Internet site, according embodiments of the present disclosure.

FIG. 4 illustrates one method 250 for an authentication server 120 to verify a message 140 posted to an Internet site 125. The method 250 comprises storing a mapping between a key string 190 and a predefined geographic region 135 (block 260). The method 250 further comprises obtaining a first message 140 posted to the Internet site 125, the first message 140 comprising a text part 185 comprising the key string 190, and a media part 155, distinct from the text part 185, comprising a first geographic location 145*a* (block 270). The method 250 further comprises detecting the key string 190 within the text part 185 of the first message 140 (block 280) and verifying the first message 140 by determining that the first geographic location 145*a* in the first message 140 is within the predefined geographic region 135 mapped to the key string 190.

Figure 5:
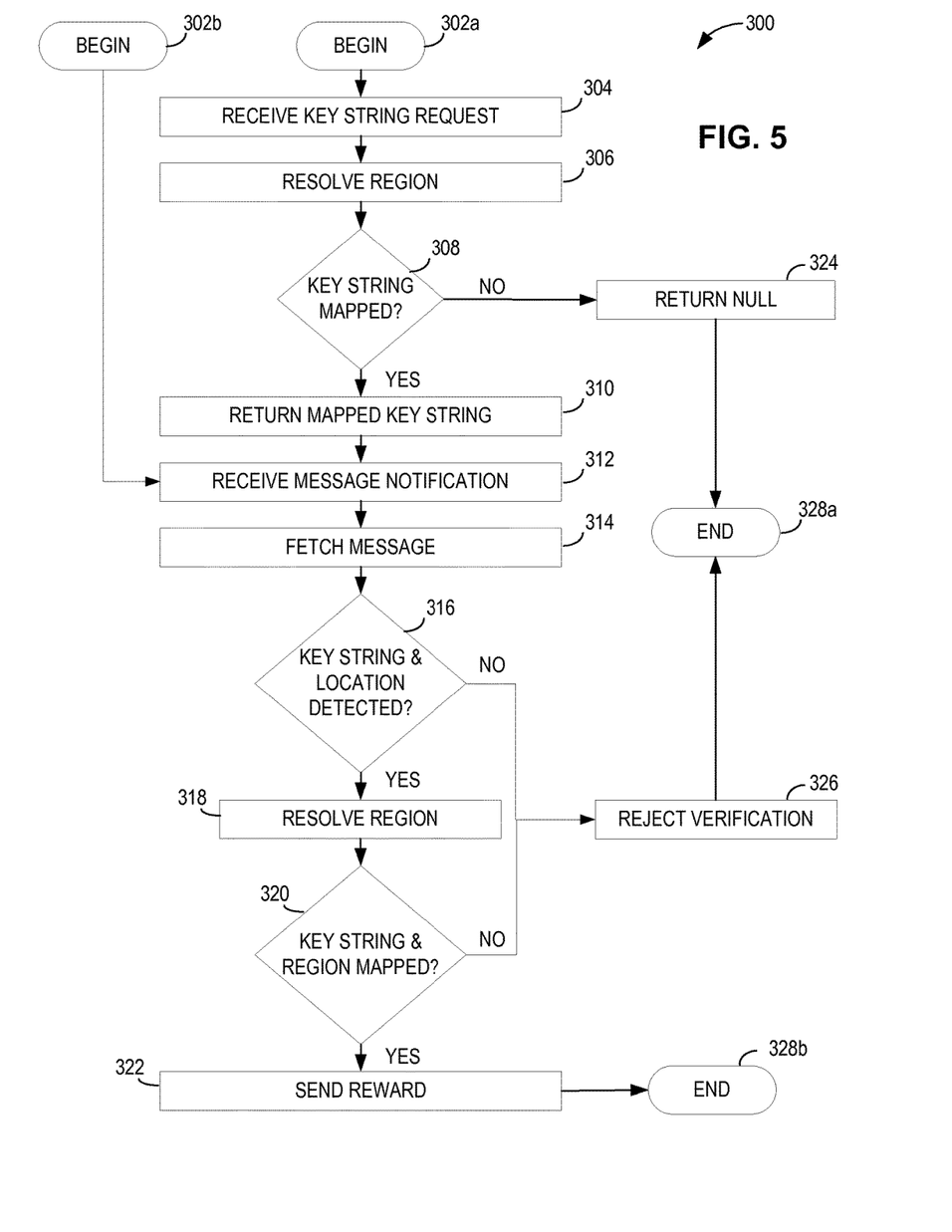
FIG. 5 illustrates a further exemplary method for an authentication server to verify a message posted to an Internet site, according to embodiments of the present disclosure.

FIG. 5 illustrates a more detailed method 300 for an authentication server 120 to verify a message 140 posted to an Internet site 125. As previously discussed, the authentication server 120 stores a mapping between a key string 190 and a predefined geographic region 135. According to embodiments, there may be multiple key strings 190 mapped to multiple geographic regions 135. Various embodiments can also support one-to-many and many-to-one relationships between key strings 190 and geographic regions 135. The authentication server 120 also supports a request from a user device 110 for a key string 190, the key string request comprising a geographic location 145. Thus, when a user device 110 sends such a key string 190 request, the method begins (block 302*a*) when the authentication server 120 receives that key string 190 request (block 304). The authentication server 120 resolves the geographic location 145 in the key string 190 request into a predefined geographic region 135 (block 306). To do so, the authentication server 120 may make use of a separate location server 148, as described above. The authentication server 120 then checks whether a key string 190 is mapped to the resolved predefined geographic region 135 (block 308). If no key string is mapped to the resolved predefined geographic region 135, then the authentication server 120 returns a null response, empty string, or error message to the user device 110 (block 324) and the method ends (block 328). Otherwise, the authentication server 120 returns, to the user device 110, the key string 190 that is mapped to the resolved predefined geographic location 135 (block 310).

The authentication server 120 also supports notification that a message 140 has been posted to an Internet site 125. The notification can be received from a user device 110 that has previously sent a key string 190 request as discussed above, or can be received from another user device 110 that learned of a key string 190 from another source. For example, promotional advertisements may have previously informed the public about which key string 190 to use in order to obtain rewards, such that a request for an appropriate key string 190 is unnecessary. When user devices 110 skip sending a key string 190 request, the method 300 begins (block 302*b*) with the authentication server 120 receiving a notification that a message 140 has been posted to an Internet site 125 (block 312). Alternatively, the method 300 may continue with the authentication server 120 receiving a notification that a message 140 has been posted to an Internet site 125 from the same user device 110 that previously sent the key string 190 request.

In either case, the authentication server 120 will fetch the message 140 from the Internet site 125 (block 314) and will check the message 140 for a key string 190 and a geographic location 145 as described above (block 316). If the message 140 does not contain a key string 190 that the authentication server 120 has mapped to a predefined geographic region 135, or if the message 140 does not contain a geographic location 145, the authentication server will reject verification of the message 140 (block 326) and the method 300 will end (block 328*a*). Otherwise, the authentication will use the geographic location 145 included in the message to resolve a predefined geographic region 135, using a location server 148 as appropriate.

The authentication server 120 will then check whether the key string 190 in the posted message 140 and the predefined geographic region 135 resolved from the posted message 140 are mapped. If the authentication server 120 does not have a stored mapping between the key string 190 in the posted message 140 and the predefined geographic region 135 resolved from the posted message 140, the authentication server will reject verification of the message 140 (block 326) and the method 300 will end (block 328*a*). However, if the authentication server 120 has a mapping stored between the key string 190 in the posted message 140 and the predefined geographic region 135 resolved from the posted message 140, the authentication server 120 considers the message 140 verified. Accordingly, the authentication server 120 sends a reward notice to the Internet user associated with the user device 110 that posted the message 140 (block 322), and the method ends (block 328*b*).

Figure 6:
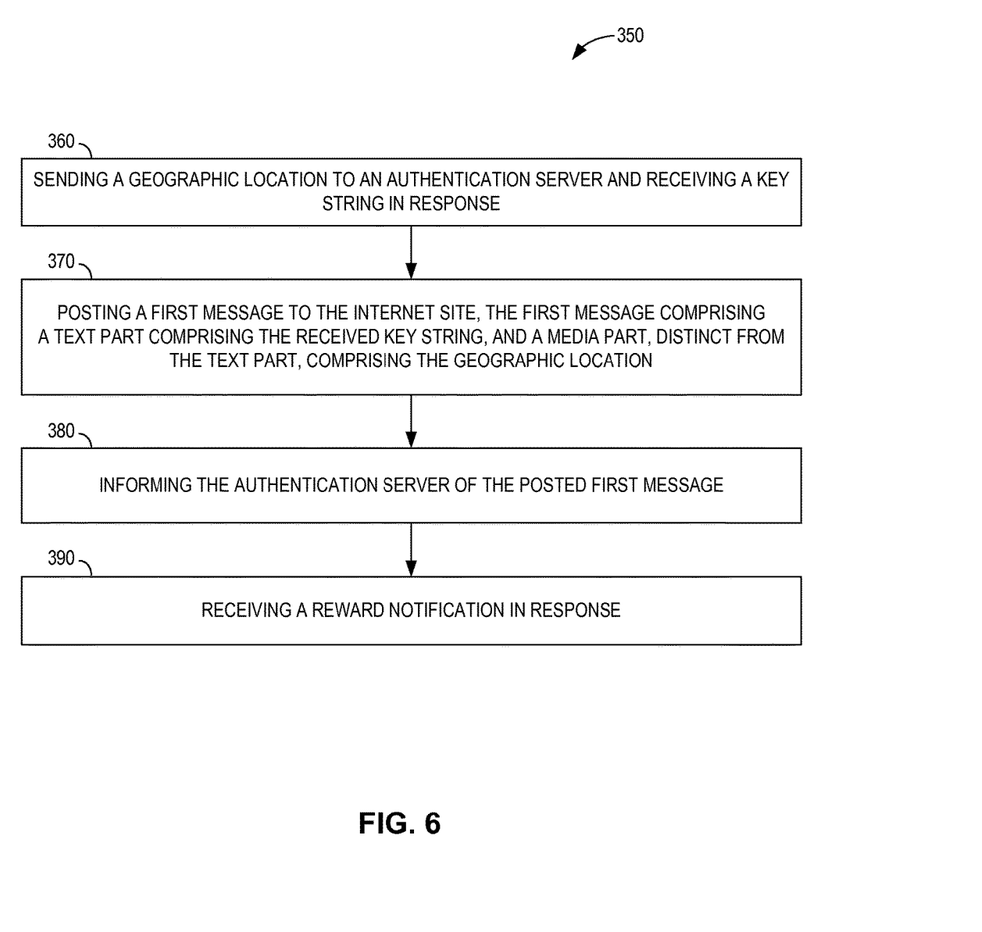
FIG. 6 illustrates an exemplary method for a user device to obtain a reward notification by posting a message to an Internet site, according to embodiments of the present disclosure.

FIG. 6 illustrates one method 350 for a user device 110 to obtain a reward notification by posting a message 140 to an Internet site 125. The method 350 comprises sending a geographic location 145 to an authentication server 120 and receiving a key string 190 in response (block 360). The method 350 further comprises posting a first message 140 to the Internet site 125 (block 370). The first message 140 comprises a text part 185 comprising the received key string 190, and a media part 155, distinct from the text part 185, comprising the geographic location 145. The method 350 further comprises informing the authentication server 120 of the posted first message 140 (block 380). Finally, the method 350 comprises the user device 110 receiving a reward notification (block 390).

Figure 7:
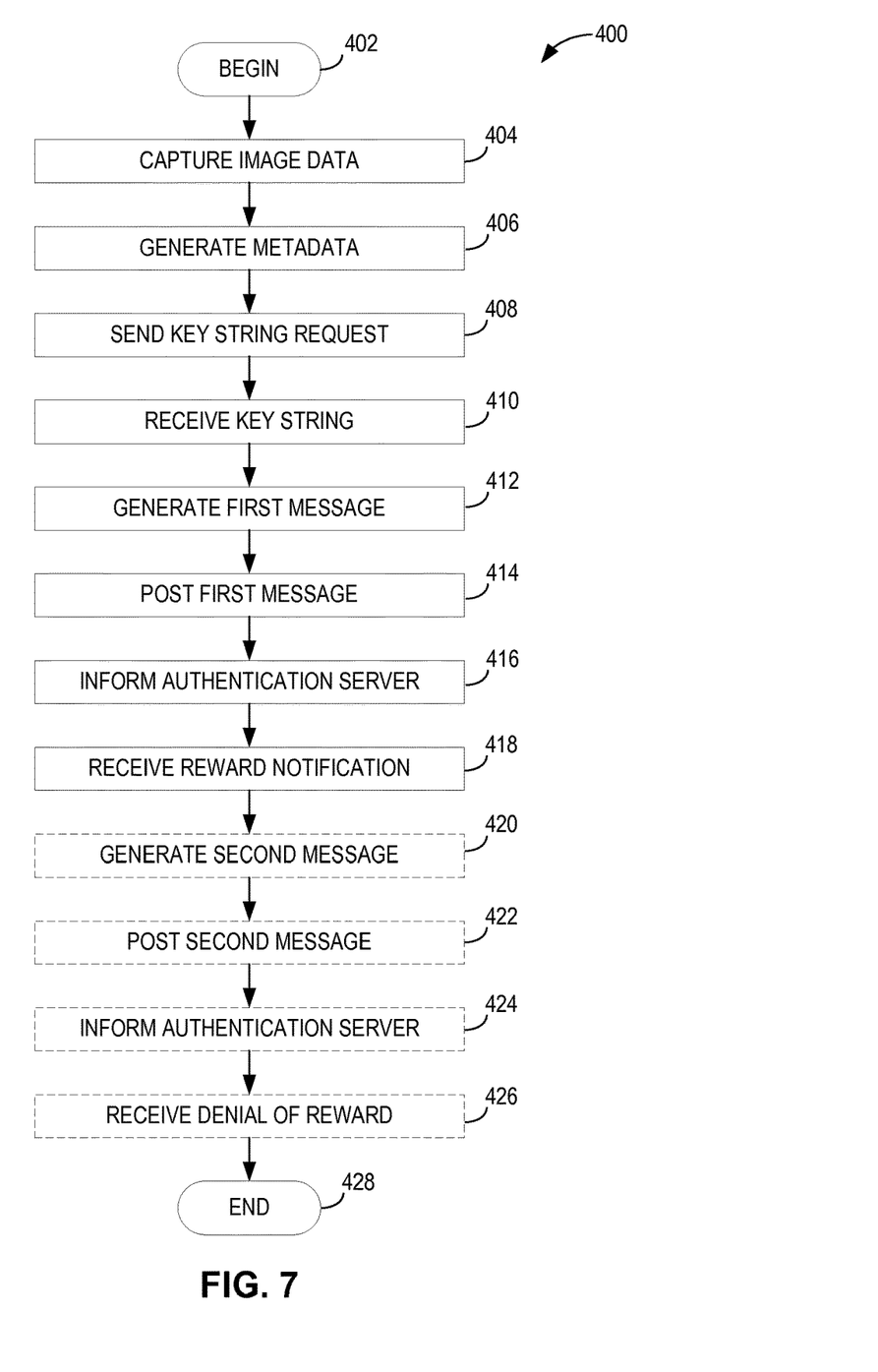
FIG. 7 illustrates a further exemplary method for a user device to obtain a reward notification by posting a message to an Internet site, according to embodiments of the present disclosure.

FIG. 7 illustrates a more detailed method 400 for a user device 110 to obtain a reward notification by posting a message 140 to an Internet site 125, such as a social media site, or web forum. The method 400 begins (block 402) with the user device 110*a* capturing image data 160, such as a photo or a video, at a geographic location 145*a* that is within a predefined geographic region 135 (block 404). Upon capturing the image data 160, the user device 110*a* generates metadata 165 describing the image data 160 (block 406). The metadata 165 comprises, e.g., the geographic location 145*a* and date/time 180 where the image data 160 was captured. The metadata 165 may also comprise information about the encoding of the image data 160, such as the file type 180.

The user device 110*a* sends the geographic location 145*a* of where the image data 160 was captured to an authentication server 120 in a key string 190 request (block 408). The user device 110*a* receives a key string 190 from the authentication server 120 in response (block 410). The user device 110*a* then generates a first message 140 that includes the image data 160, the metadata 165, and the key string 190 (block 412). The image data 160 and the metadata 165 are comprised within a media part 155 of the first message 140. The key string 190 is embedded within a text part 185 of the first message 140. A user may also include additional text data within the text part 185, such as a comment or a caption of the image data 160. According to embodiments, the key string 190 is a metadata tag, such as a hashtag, that is used by the Internet site 125 to track other messages also comprising the key string 190.

The user device 110*a* then posts the first message 140 to the Internet site 125 such that the first message 140 can be accessed by the authentication server (block 414). To enable the authentication server to access the first message, the user device 110a may configure a user account on the Internet site 125 to trust the authentication server 120. Alternatively, the user device 110a may post the first message 140 publicly. Having posted the first message 140, the user device 110a informs the authentication server 120 of the posted first message 140 (block 416). In response, the user device 110a receives a reward notification (block 418).

According to various embodiments, after the user device 110a receives the reward notification, the method 400 ends (block 428). According to other embodiments, the user device 110a generates a second message that does not meet the criteria of the authentication server 120 to receive a reward (block 420). For example, the second message may omit the key string 190, may omit the geographic location 145a, may include a geographic location 145b that is outside of the predefined geographic region 135, or may simply be a duplicate of the first message 140 (for which the user of user device 110a has already received a reward, for example). The user device 110a posts the second message to the Internet site 125 (block 422) and informs the authentication server of the posted second message (block 424). In response, the user device 110a receives a denial of the reward, such as an error message or a diagnostic message indicating why no reward notification will issue from the authentication server 120 (block 426). The method 400, thereafter, ends (block 428). Of course, one of ordinary skill will recognize that, according to embodiments, the second message could be sent before, after, or concurrently with the first message, without departing from the scope of the invention.

Figure 8:
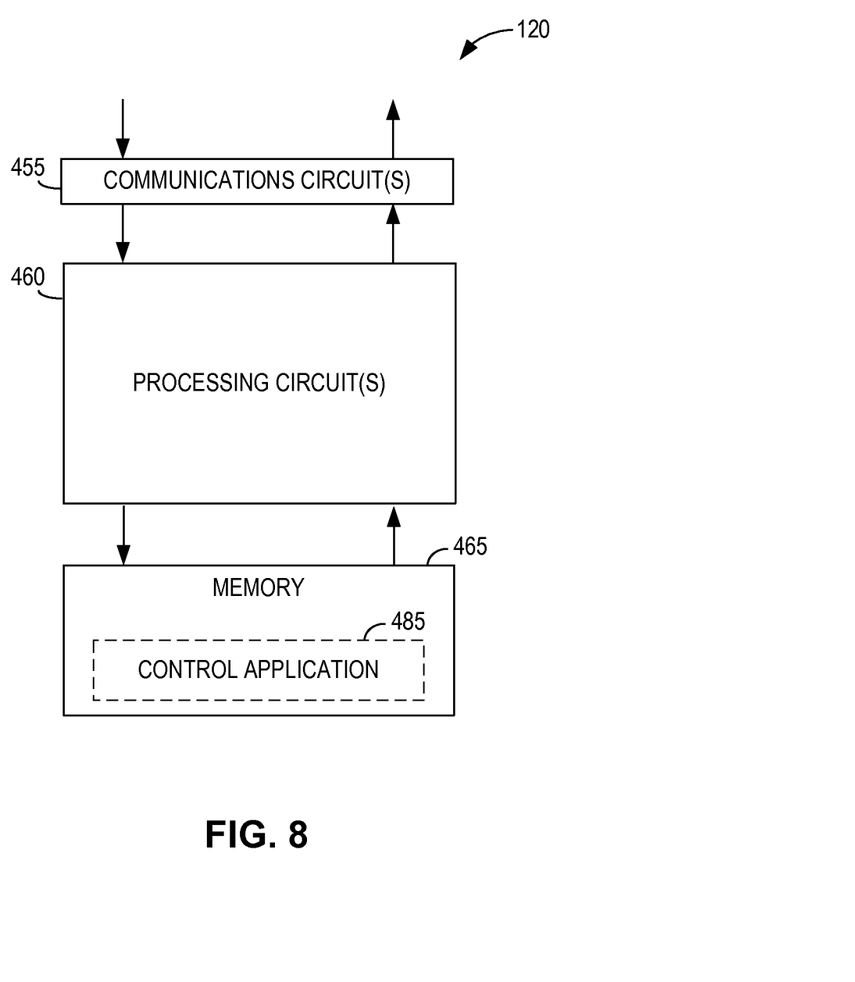
FIG. 8 illustrates exemplary authentication server hardware useful for implementing the methods described herein, according to embodiments of the present disclosure.

FIG. 8 illustrates an exemplary authentication server 120 that may be used to implement the procedures described herein according to one or more embodiments. Authentication server 120 comprises one or more processing circuits 460 coupled to memory 465 and one or more communications circuits 455 via, for example, one or more buses. The communications circuits 455 are configured to exchange messages with other devices, such as a user device 110, over a communications network such as public network 105. According to embodiments of the present disclosure, the memory 465 is capable of storing, and the one or more processing circuits 460 are capable of executing, a control application 485 which when executed is capable of causing the authentication server 120 to perform methods 250, and functions described herein.

The memory 465 is configured to store a mapping between a key string and a predefined geographic region. The one or more communications circuits 455 are configured to obtain a first message 140 posted to the Internet site 125. The first message 140 comprises a text part 185 that comprises the key string 190. The first message also comprises a media part 155 that comprises a first geographic location 145a. The media part 155 of the first message 140 is distinct from the text part 185 of the first message 140. The one or more processing circuits 460 are configured to detect the key string 190 within the text part 185 of the first message 140, and verify the first message 140 by determining that the first geographic location 145a in the first message 140 is within the predefined geographic region 135 mapped to the key string 190.

Figure 9:
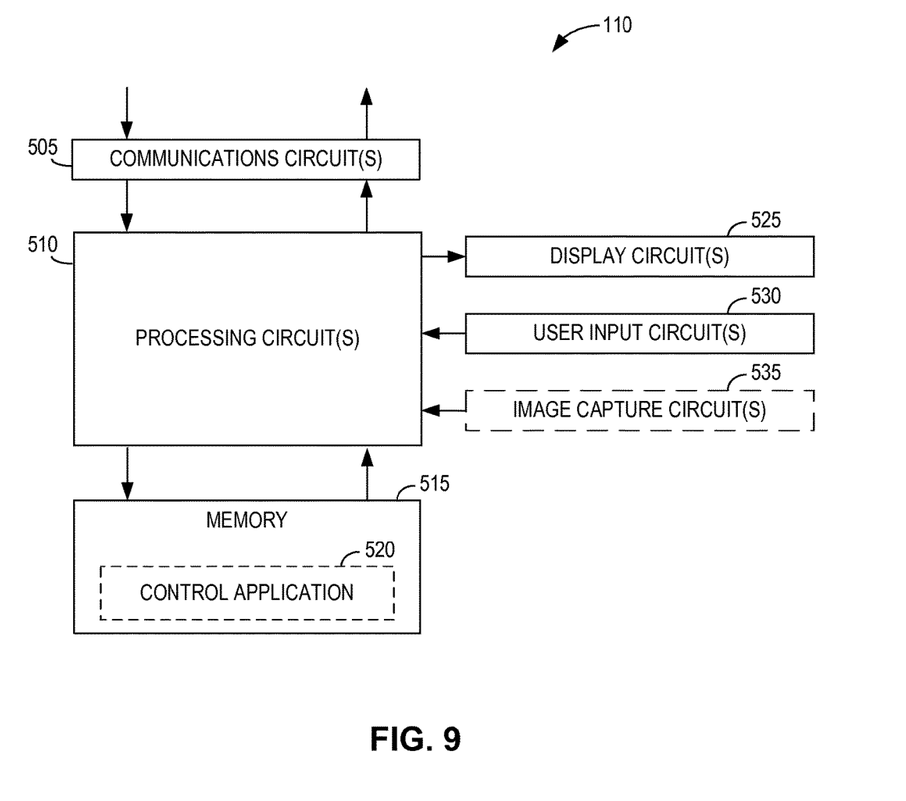
FIG. 9 illustrates exemplary user device hardware useful for implementing the methods described herein, according to embodiments of the present disclosure.

FIG. 9 illustrates an exemplary user device 110 that may be used to implement the procedures described herein according to one or more embodiments. User device 110 comprises memory 515, one or more display circuits 525, one or more user input circuits 530, and one or more communications circuits 505, each of which is communicatively coupled to one or more processing circuits 510 via, for example, one or more buses. According to embodiments, the user device 110 further comprises one or more image capture circuits 535 useful for capturing image data 160.

The communications circuits 505 are configured to exchange messages with other devices, such as a authentication server 120, over a communications network such as public network 105. The one or more display circuits 525 are useful to output signals to be viewed by a user of the user device 110. For example, the one or more display circuits 525 may be comprised within one or more of a graphics adapter, a graphical processing unit, a display port, a Liquid Crystal display, and a Light Emitting Diode display. The one or more user input circuits 530 are useful to accept input signals from the user of the user device 110. For example, the one or more user input circuits 530 may be comprised within one or more of a pointing device (such as a mouse, stylus, touchpad, trackball, pointing stick, joystick), a touchscreen, a microphone for speech input, an optical sensor for optical recognition of gestures, and a keypad or keyboard. According to embodiments of the present disclosure, the memory 515 is capable of storing, and the one or more processing circuits 510 are capable of executing, a control application 520 which when executed is capable of causing the user device 110 to perform methods 350, 400 and functions described herein.

The one or more communications circuits 505 are configured to potentially receive a reward notification in response to sending a geographic location 145a to an authentication server 120 and receiving a key string 190 in response. The one or more communications circuits 505 are further configured to potentially receive a reward notification in response to posting a first message 140 to the Internet site 125. The first message 140 comprises a text part 185 that comprises the received key string 190. The first message 140 also comprises a media part, distinct from the text part, comprising the geographic location 145a. The one or more communications circuits 505 are further configured to potentially receive a reward notification in response to informing the authentication server 120 of the posted first message 140.

The one or more processing circuits 460, 510 of the various embodiments may comprise any sequential state machine capable of executing machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

The memory 465, 515 of the various embodiments may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The one or more communications circuits 455, 505 of the various embodiments may comprise analog and/or digital transceiving circuitry capable of communicating with each other, or with other devices, according to one or more communication protocols known in the art or that may be developed, such as HTTP, RTP, RTCP, HTTPs, Ethernet, TCP/IP, ATM, or the like. The one or more communications circuits 455, 505, implement receiver and transmitter functionality appropriate to the communication network to which it is attached (e.g., optical, electrical, and the like). The transmitter and receiver functionality may share circuit components and/or software, or alternatively may be implemented separately within the one or more communications circuits 455, 505.

Variations to the hardware embodiments of authentication server 120 and user device 110, and the engineering tradeoffs associated therewith, will be readily appreciated by the skilled practitioner. Since the design and cost tradeoffs for the various hardware approaches, which may depend on system-level requirements that are outside the scope of the present disclosure, are well known to those of ordinary skill in the art, further details of specific hardware implementations are not provided herein. In addition, the control application 485, 520 of the various embodiments may comprise the entirety or any portion of an application, "app," script, software module, software library, software service, operating system, application programming interface (API), or any combination thereof, as will be apparent to one of ordinary skill in the art.

The present invention may be carried out in other ways than those specifically set forth herein without departing from the essential characteristics of the invention. The present embodiments are to be considered in all respects as illustrative and not restrictive, and all changes coming within the meaning and equivalency range of the appended claims are intended to be embraced therein.

What is claimed is:

1. A method, implemented in an authentication server, of verifying a message posted to an Internet site, the method comprising:
    storing a mapping between a key string and a predefined geographic region;
    receiving a key string request from a user device, the key string request comprising a first geographic location;
    sending the first geographic location to a location server and receiving the predefined geographic region in response;
    determining the key string using the predefined geographic region and the stored mapping, and in response, sending the key string to the user device;
    obtaining a first message posted to the Internet site, the first message comprising:
        a text part comprising the key string; and
        a media part, distinct from the text part, comprising the first geographic location;
    detecting the key string within the text part of the first message;
    verifying the first message by determining that the first geographic location in the first message is within the predefined geographic region mapped to the key string.

2. The method of claim 1, further comprising:
    receiving a notification that the first message has been posted to the Internet site; and
    wherein obtaining the first message comprises fetching the first message from the Internet site.

3. The method of claim 1:
    wherein the first message is associated with an Internet user; and
    further comprising sending a reward notice to the Internet user in response to verifying the first message.

4. The method of claim 1, wherein the key string is a metadata tag used by the Internet site to track other messages also comprising the key string.

5. The method of claim 1:
    wherein the media part of the first message comprises:
        image data; and
        metadata describing the image data; and
    wherein the first geographic location is comprised within the metadata describing the image data.

6. The method of claim 1, wherein verifying the first message by determining that the first geographic location in the first message is within the predefined geographic region mapped to the key string comprises:
    sending the first geographic location in the first message to a location server and receiving the predefined geographic region in response;
    determining that the key string in the first message corresponds to the predefined geographic region according to the stored mapping.

7. The method of claim 1, further comprising:
    obtaining a second message posted to the Internet site; and
    rejecting verification of the second message in response to at least one of:
        the second message omitting the key string;
        the second message omitting the first geographic location; and
        the second message comprising the key string and a second geographic location, the second geographic location being outside of the predefined geographic region mapped to the key string.

8. A method, implemented in a user device, of obtaining a reward notification by posting a message to an Internet site, the method comprising:
    sending a key string request comprising a geographic location to an authentication server;
    receiving a key string from the authentication server in response to the key string request if the geographic location is within a predefined geographic region;
    responsive to receiving the key string from the authentication server, posting a first message to the Internet site, the first message comprising:
        a text part comprising the received key string; and
        a media part, distinct from the text part, comprising the geographic location; and
    receiving a reward notification in response to informing the authentication server of the posted first message.

9. The method of claim 8, further comprising:
    capturing image data at the geographic location; and
    generating metadata describing the image data, the metadata comprising the geographic location, upon capturing the image data;
    wherein the media part of the first message comprises the image data and the metadata.

10. The method of claim 8, wherein the received key string is a metadata tag used by the Internet site to track other messages also comprising the received key string.

11. The method of claim 8, further comprising receiving a denial of the reward in response to posting a second message to the Internet site, the second message omitting one or more of:
    the received key string; and
    the geographic location.

12. An authentication server that verifies a message posted to an Internet site, the authentication server comprising:
    memory configured to store a mapping between a key string and a predefined geographic region;
    one or more communications circuits configured to:
        receive a key string request from a user device, the key string request comprising a first geographic location; and send the first geographic location to a location server and receive the predefined geographic region in response;
one or more processing circuits communicatively coupled to the communications circuits and the memory and configured to determine the key string using the predefined geographic region and the mapping stored in memory;
wherein the one or more communications circuits are further configured to:
send the key string to the user device in response to the one or more processing circuits determining the key string;
obtain a first message posted to the Internet site, the first message comprising:
a text part comprising the key string;
a media part, distinct from the text part, comprising the first geographic location;
detect the key string within the text part of the first message; and
verify the first message by determining that the first geographic location in the first message is within the predefined geographic region mapped to the key string.

13. The authentication server of claim 12:
wherein the one or more communications circuits are further configured to receive a notification that the first message has been posted to the Internet site; and
wherein, to obtain the first message, the one or more communications circuits are configured to fetch the first message from the Internet site.

14. The authentication server of claim 12:
wherein the first message is associated with an Internet user; and
wherein the one or more communications circuits are further configured to send a reward notice to the Internet user in response to the one or more processing circuits verifying the first message.

15. The authentication server of claim 12, wherein the key string is a metadata tag used by the Internet site to track other messages also comprising the key string.

16. The authentication server of claim 12:
wherein the media part of the first message comprises:
image data; and
metadata describing the image data; and
wherein the first geographic location is comprised within the metadata describing the image data.

17. The authentication server of claim 12, wherein, to verify the first message by determining that the first geographic location in the first message is within the predefined geographic region mapped to the key string, the one or more processing circuits are configured to:
send the first geographic location in the first message to a location server via the one or more communications circuits and receive the predefined geographic region in response;
determine that the key string in the first message corresponds to the predefined geographic region according to the mapping stored in memory.

18. The authentication server of claim 12:
wherein the one or more communications circuits are further configured to obtain a second message posted to the Internet site; and
wherein the one or more processing circuits are further configured to reject verification of the second message in response to at least one of:
the second message omitting the key string;
the second message omitting the first geographic location;
the second message comprising the key string and a second geographic location, the second geographic location being outside of the predefined geographic region mapped to the key string.

19. A user device that obtains a reward notification by posting a message to an Internet site, the user device comprising:
one or more communications circuits configured to:
send a key string request comprising a geographic location to an authentication server;
receive a key string from the authentication server in response to the key string request if the geographic location is within a predefined geographic region;
responsive to receiving the key string from the authentication server, post a first message to the Internet site, the first message comprising:
a text part comprising the received key string;
a media part, distinct from the text part, comprising the geographic location;
receive a reward notification in response to informing the authentication server of the posted first message.

20. The user device of claim 19, further comprising:
one or more image capture circuits configured to capture image data at the geographic location;
one or more processing circuits configured to generate metadata describing the image data, the metadata comprising the geographic location, upon the one or more image capture circuits capturing the image data;
wherein the one or more communications circuits are configured to receive the reward notification in further response to the one or more image capture circuits capturing the image data and the one or more processing circuits generating the metadata.

21. The user device of claim 19, wherein the received key string is a metadata tag used by the Internet site to track other messages also comprising the received key string.

22. The user device of claim 19, wherein the one or more communications circuits are further configured to receive a denial of the reward in response to posting a second message to the Internet site, the second message omitting one or more of:
the received key string; and
the geographic location.

23. A computer program product stored in a non-transitory computer readable medium for controlling a programmable authentication server, the computer program product comprising software instructions that, when run on the programmable authentication server, cause the programmable authentication server to:
store a mapping between a key string and a predefined geographic region;
receive a key string request from a user device, the key string request comprising a first geographic location;
send the first geographic location to a location server and receiving the predefined geographic region in response;
determine the key string using the predefined geographic region and the stored mapping, and in response, sending the key string to the user device;
obtain a first message posted to the Internet site, the first message comprising:
a text part comprising the key string;
a media part, distinct from the text part, comprising the first geographic location;
detect the key string within the text part of the first message; and verify the first message by determining that the first geographic location in the first message is within the predefined geographic region mapped to the key string.

24. A computer program product stored in a non-transitory computer readable medium for controlling a programmable user device, the computer program product comprising software instructions that, when run on the programmable user device, cause the programmable user device to:

send a key string request comprising a geographic location to an authentication server;

receive a key string from the authentication server in response to the key string request if the geographic location is within a predefined geographic region;

responsive to receiving the key string from the authentication server, post a first message to the Internet site, the first message comprising:
  a text part comprising the received key string;
  a media part, distinct from the text part, comprising the geographic location;

receive a reward notification in response to informing the authentication server of the posted first message.

* * * * *